United States Patent
Klingbeil et al.

(10) Patent No.: US 9,660,887 B1
(45) Date of Patent: *May 23, 2017

(54) ADAPTIVE AUDIO STREAM WITH LATENCY COMPENSATION CROSS REFERENCE TO OTHER APPLICATIONS

(71) Applicant: Amazon Technologies, Inc., Seattle, WA (US)

(72) Inventors: Michael Klingbeil, New Haven, CT (US); Adam Marks, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,738

(22) Filed: Dec. 9, 2016

Related U.S. Application Data

(63) Continuation of application No. 14/581,321, filed on Dec. 23, 2014, now Pat. No. 9,521,057.

(60) Provisional application No. 62/063,868, filed on Oct. 14, 2014.

(51) Int. Cl.
*H04L 12/26* (2006.01)
*H04L 12/853* (2013.01)
*H04L 12/841* (2013.01)
*H04L 29/06* (2006.01)
*H04L 12/835* (2013.01)

(52) U.S. Cl.
CPC ........ *H04L 43/087* (2013.01); *H04L 47/2416* (2013.01); *H04L 47/283* (2013.01); *H04L 47/30* (2013.01); *H04L 65/403* (2013.01)

(58) Field of Classification Search
CPC .. H04J 3/0617; H04J 3/0626; H04J 2011/002; H04L 1/205; H04L 47/32; H04L 45/121; H04L 47/10; H04L 12/5695; H04L 47/24; H04L 47/70; H04L 49/206; H04L 12/54; H04L 49/252; H04L 12/18; H04L 29/06414; H04L 43/087; H04L 47/2416; H04L 47/283; G01R 29/26; H04W 28/0236; G06F 15/17312; H04M 2203/2088; H04M 3/56; H04M 3/561; H04M 3/567
See application file for complete search history.

(56) References Cited

U.S. PATENT DOCUMENTS

| | | | |
|---|---|---|---|
| 2004/0062233 A1* | 4/2004 | Brown | H04L 12/66 370/352 |
| 2005/0047396 A1* | 3/2005 | Helm | H04L 47/10 370/352 |
| 2010/0091769 A1* | 4/2010 | Magliaro | G10L 19/24 370/352 |
| 2012/0324520 A1* | 12/2012 | Van Deventer | H04L 65/605 725/109 |
| 2014/0226476 A1* | 8/2014 | Bertze | H04L 47/30 370/230.1 |

(Continued)

*Primary Examiner* — Ashley Shivers
(74) *Attorney, Agent, or Firm* — Thorpe North & Western LLP

(57) ABSTRACT

A latency compensating adaptive jitter buffer method is implemented. In response to a queuing delay event being detected, the size of the jitter buffer is temporarily increased to receive all incoming audio packets up to a certain refill level. The method then produces audio playback using accelerated playback to reduce the jitter buffer size back to the nominal size.

20 Claims, 5 Drawing Sheets

(56) References Cited

U.S. PATENT DOCUMENTS

2014/0310008 A1* 10/2014 Kang ................... G10L 19/00
704/500

* cited by examiner

ADAPTIVE AUDIO STREAM WITH LATENCY COMPENSATION CROSS REFERENCE TO OTHER APPLICATIONS

CROSS REFERENCE TO OTHER APPLICATIONS

This application claims priority to U.S. Provisional Patent Application No. 62/063,868, entitled ADAPTIVE AUDIO STREAM WITH LATENCY COMPENSATION, filed Oct. 14, 2014, which is incorporated herein by reference for all purposes and U.S. Non-Provisional patent application Ser. No. 14/581,321 filed Dec. 23, 2014, now U.S. Pat. No. 9,521,057, entitled Adaptive Audio Stream with Latency Compensation.

BACKGROUND OF THE INVENTION

Reliable and timely delivery of audio data is a critical component in applications such as interactive audio conferencing, broadcasting, and telephony. Audio transmission over packet switched networks can be susceptible to packet loss (which causes dropouts), and queuing delay (which causes high latency), sometimes referred to as network delay. Low latency transmission is particularly important for effective two-way or multiparty conversation. Once latency begins to exceed 250 milliseconds, the interactive give-and-take of natural conversational speech becomes more difficult. People may start to talk over each other and may have difficulty agreeing upon who should talk first. Additionally the increased occurrence of these "doubletalk" scenarios forces acoustic echo cancellation to work harder to cancel out far end audio.

A more subtle and serious problem results from queuing delay variation. In the present description, "queuing delay" refers to delays in audio data packets (or "audio packets") arriving and being queued up at the destination node. Queuing delay can include network delay and/or other sources of packet delays, such as uneven audio production rate at the source node. As the queuing delay varies, so does the arrival time of each individual audio data packet. For example, if the audio signal is divided into equal 40 millisecond segments, the destination node typically expects the audio packets to arrive at the regular 40 millisecond intervals. Queuing delay variation results in unsteady delivery of the individual audio packets to the destination node. For example, a late packet might arrive at the destination node after 100 milliseconds have elapsed (rather than the expected 40 milliseconds). Subsequent packets queued up behind it might arrive at the destination node in a big burst after an additional 5 milliseconds. In order to present a continuous unbroken audio stream to the listener, a jitter buffer at the destination node can be used to absorb the delay variation. A jitter buffer is a specialized priority queue where the incoming audio packets are ordered by increasing audio timestamp. Incoming audio packets, which may have unpredictable arrival times, are stored in the jitter buffer in sorted order. Audio packets are retrieved from the buffer at a steady rate and can be assembled into a continuous unbroken audio stream for playback. As long as the buffer never becomes empty, there won't be any dropouts in the playback audio stream. The jitter buffer itself introduces some delay of its own, referred to as latency, so it is desirable to keep the buffer size as small as possible.

While it is desirable to have a small jitter buffer size to keep the latency low (for interactive conversation), there is also a need to be able to absorb potentially large queuing delays that may happen from time to time. If the jitter buffer size is kept small, and there is a large delay spike, then many of the late arriving packets will end up being discarded because they will not all fit in the jitter buffer. If the jitter buffer size is made large, then the buffer is able to absorb a large change in the queuing delay, but the latency will be too high for real-time applications. Accordingly, there is a packet loss versus latency tradeoff in the sizing of the jitter buffer.

BRIEF DESCRIPTION OF THE DRAWINGS

Various embodiments of the invention are disclosed in the following detailed description and the accompanying drawings.

DETAILED DESCRIPTION

Figure 1:
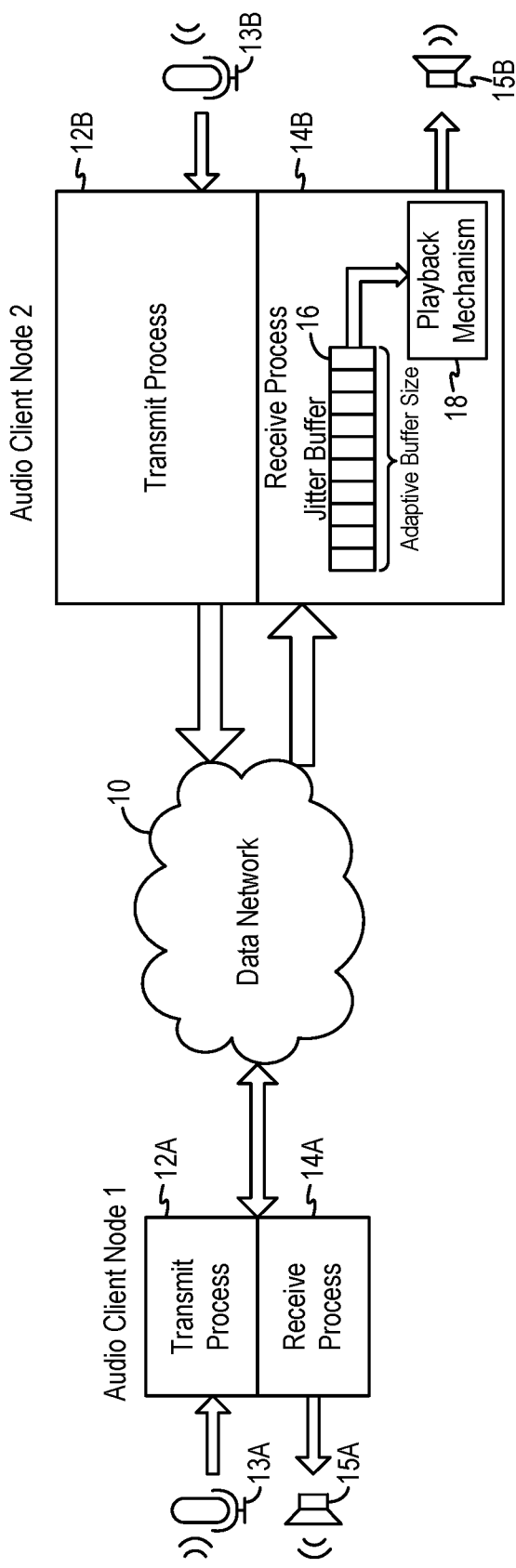
FIG. 1 illustrates an environment where audio signals are exchanged through peer-to-peer audio communication in some examples.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a latency compensating adaptive jitter buffer method is implemented in an audio client running on a user device or in an audio server to adaptively adjust the size of a jitter buffer to optimize latency while minimizing packet loss during audio signal transmission. In some embodiments, the latency compensating adaptive jitter buffer method is implemented in a receive process being executed by the audio client or the audio server. In some embodiments, the jitter buffer is kept to a nominal size which is a small buffer size for low latency. In response to a queuing delay event being detected, audio production is temporarily stopped and the size of the jitter buffer is temporarily increased to receive all incoming audio packets up to a certain refill level. Increasing the jitter buffer size introduces a large amount of latency. The latency compensating adaptive jitter buffer method compensates for the large latency by accelerating the audio playback, thereby gradually, and as quickly as possible, reducing the size of the jitter buffer to remove the latency and catch back up to real-time. For audio applications, there are various techniques to accelerate the audio playback so that audio data is fetched from the jitter buffer faster than the audio data is being added, thereby progressively reducing the jitter buffer size and corresponding latency.

The latency compensating adaptive jitter buffer method of the present invention can be applied in audio communication being carried out over a data network where delays and delay variations can be unpredictable. The audio communication can be a peer-to-peer audio communication over a data network, such as using Internet Telephony. The audio communication can also be a multi-participant voice or video conference. A voice or video conference may be facilitated through a conference server provided in a public data network or a private data network.

FIG. 1 illustrates an environment where audio signals are exchanged through peer-to-peer audio communication in some examples. FIG. 1 illustrates a network environment in which the latency compensating adaptive jitter buffer method of the present invention may be advantageous employed to improve the quality of the audio signals being presented to users engaging in the audio communication at the audio client nodes, despite unpredictable network conditions. In some examples, the audio client nodes may be part of a video and audio conference or a conference call held between multiple participants, such as a conference call between two or more participants. Although FIG. 1 illustrates audio signals being exchanged between two audio client nodes, the latency compensating adaptive jitter buffer method of the present invention can be applied to a network environment involving three or more audio client nodes participating in a conference call.

Referring to FIG. 1, a user at the first audio client node (Audio Client Node 1) exchanges audio communication with another user at the second audio client node (Audio Client Node 2) over a data network 10. The audio signals may be communicated over a public data network, such as the Internet, or a private data network. The conversation between the two users may be carried out using a multimedia application running on the users' respective user devices. The multimedia application may include an Internet Telephony application or a video conferencing application. In the present description, each user device makes a connection to the multimedia application using an audio client and the audio client associated with each user's device is referred to as an "audio client node." The audio client may be a software process running on a processor of the user's device, which may be any type of computing devices, such as laptop computers, desktop computers, tablet computing devices, smart phones, or a dedicated audio conferencing device.

At each of the first and second audio client nodes, the user speaks into a microphone and hears from a speaker. Full duplex or half-duplex communication is realized between the two audio client nodes. In some embodiments, a source audio client (such as Audio Client Node 1) running on a user device executes a transmit process 12A to capture the audio signals from the associated microphone 13A and executes a receive process 14A to playback audio signals received from the other audio client nodes onto the associated speaker 15A. The transmit process 12A of the source audio client digitizes and packetizes the audio signals, such as using conventional encoding mechanism. The audio packets are then sent through the data network 10. A destination audio client (such as Audio Client Node 2), running on another user device and being connected to the same audio call, executes a receive process 14B to receive the transmitted audio packets. In embodiments of the present invention, the received data packets are stored in a jitter buffer 16 having an adaptable buffer size. In the present embodiment, the jitter buffer is a specialized priority queue configured to handle audio packets that may be arriving out of order. The jitter buffer is implemented as a priority queue in which the audio packets stored therein are sorted or ordered by increasing audio timestamp. Accordingly, incoming audio packets, which may have unpredictable and out-of-order arrival times, are stored in the jitter buffer 16 in sorted order based on the audio timestamp from oldest to newest. The receive process 14B retrieves the audio packets from the jitter buffer 16 at a steady rate and supplies the audio packets to a playback mechanism 18 which assembles the audio packets into a continuous unbroken audio stream to be played back on the speaker 15B of the destination audio client node. In FIG. 1, only the receive process 14B at the second audio client node has been expanded to illustrate the construction in detail. It is understood that the receive process 14A at the first audio client node can be constructed in the same manner. Furthermore, second audio client node further operates a transmit process 12B to send audio signals received from its microphone 13B onto the data network 10 to be forwarded to first audio client node.

The audio packets being transmitted over the data network 10 encounter various delays. In the present description, the time between an audio packet being sent from the source audio client and the time at which the audio packet is received by the receive process at the destination audio client is referred to as the queuing delay. Queuing delay can include network delay and/or other sources of packet delays, such as uneven audio production rate at the source node. As the queuing delay varies, the arrival time of each individual audio packet at the destination audio client also varies. Meanwhile, at the destination audio client, after an audio packet has been enqueued in the receive process, the audio packet must wait until all earlier packets in the jitter buffer have been played backed before the audio packet itself can be played back. The delay from the time the audio packet is put into the jitter buffer queue to the time the audio packet reaches the head of the buffer and playback can begin is referred to as latency. In embodiments of the present invention, the latency compensating adaptive jitter buffer method is implemented in the audio clients to adaptively adjust the jitter buffer size so as to minimize latency while preventing packet loss.

In some cases, audio communication over a data network is held between two or more participants using a multimedia application, such as a web-based conference call application.

Figure 2:
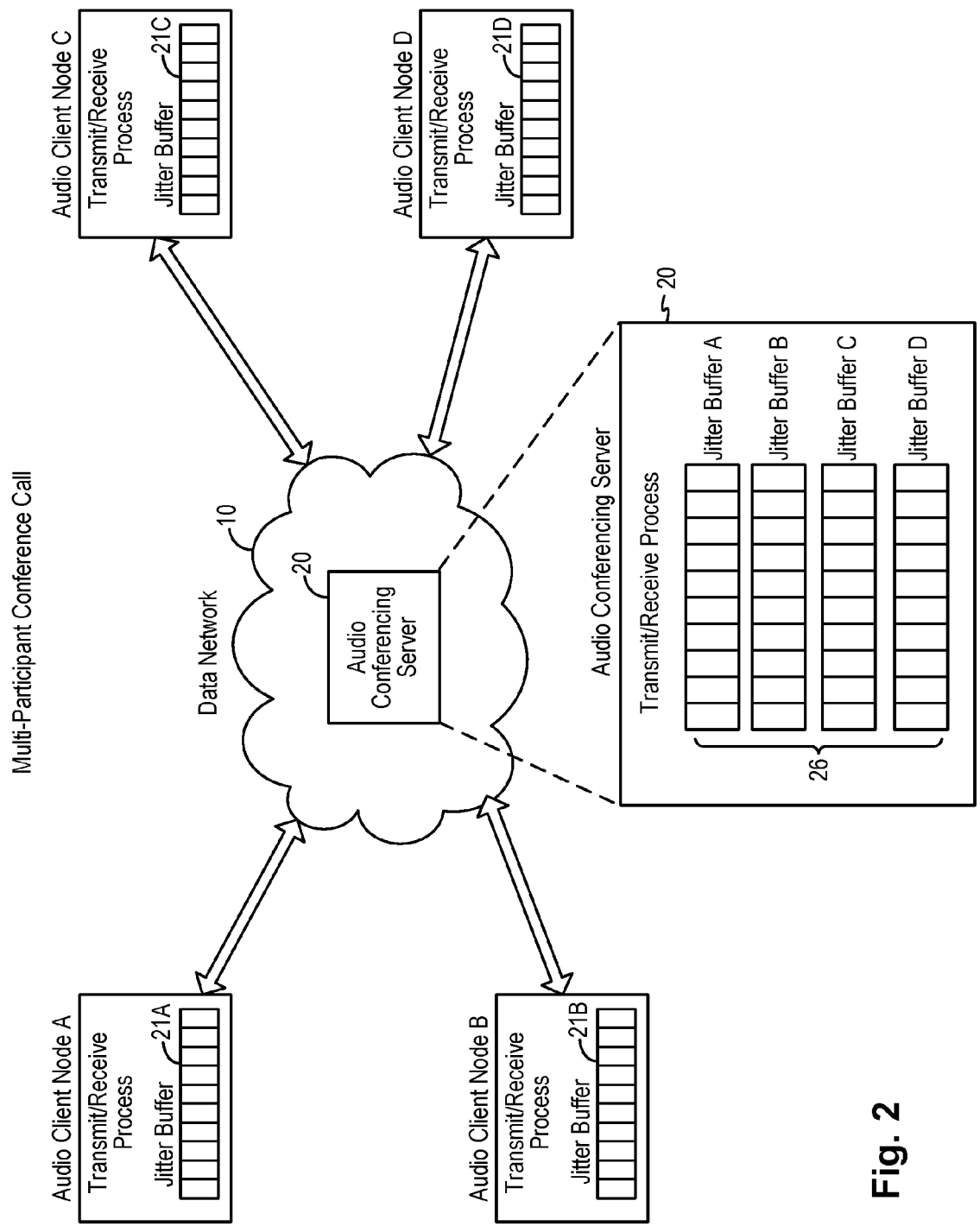
FIG. 2 illustrates an environment where audio signals are exchanged through a multi-participant conference call in some examples.

FIG. 2 illustrates an environment where audio signals are exchanged through a multi-participant conference call in some examples. Referring to FIG. 2, a web-based video/audio conferencing system includes an audio conferencing server 20 (or audio server 20) to facilitate a conference call between remote participants. The audio conferencing server 20 is deployed on a public data network, such as the Internet, or a private data network. The remote participants are typically located at separate locations and connect to the audio conferencing server through audio clients running on the participants' individual devices. In the present example, the audio conferencing server 20 facilities a conference all between four participants with audio client nodes A, B, C and D running on the participants' individual devices.

In the web-based conference call system of FIG. 2, each node where audio signals are being transmitted and received executes an audio client executing a transmit process and a receive process. Accordingly, an audio client is running on each user device to transmit audio signals and to receive audio signals. The receive process executed on each user device implements a jitter buffer 21 to store incoming audio packets. In some embodiments, each jitter buffer 21 is a specialized priority queue where the incoming audio packets are ordered by increasing audio timestamp. The receive process supplies the audio packets from the jitter buffer in sorted timestamp order to a playback mechanism which converts the audio packets into a digitized stream of audio that is played back on the speaker of the destination audio client node.

Meanwhile, the audio conferencing server 20 also receives and transmits audio packets, although the audio packets are not being "produced" or "played back" at the audio conferencing server. In some embodiments, the audio conferencing server 20 executes a receive process and a transmit process for handling incoming and outgoing processing of audio packets. More specifically, the audio conferencing server 20 receives audio packets from all the audio client nodes A-D, decodes the audio packets, mixes the audio together, and sends the newly mixed audio signals to the appropriate recipients. Accordingly, each audio client node receives an audio stream that is a mix of the received audio from the other participants of the conference call. For example, audio signals received from audio client node C may be transmitted to audio client nodes A, B and D. As further example, audio client node A will receive an audio stream being a mix of audio signals from audio client nodes B, C and D; audio client node B will receive an audio stream being a mix of audio signals from audio client nodes A, C and D; audio client node C will receive an audio stream being a mix of audio signals from audio client nodes A, B and D; and audio client node D will receive an audio stream being a mix of audio signals from audio client nodes A, B and C.

The audio conferencing server 20 executes a receive process which implements jitter buffers 26 for all of the audio client nodes connected to the conference call session. Accordingly, the audio conferencing server 20 implements jitter buffers A to D, associated with each audio client nodes A to D. The audio conferencing server 20 receives incoming audio packets from each audio client nodes A-D and stores the incoming audio packets in the respective jitter buffer A to D. In some embodiments, each jitter buffer 26 is a specialized priority queue where the incoming audio packets are ordered by increasing audio timestamp. The jitter buffers A-D supply the stored audio packets to a mixer process executed on the audio conferencing server 20 which generates a newly mixed audio stream destined for each of the client nodes A-D.

In embodiments of the present invention, the latency compensating adaptive jitter buffer method is implemented in the audio clients of the user devices and also implemented in the audio conferencing server to adaptively adjust the jitter buffer size of the jitter buffers 21 and jitter buffers 26 so as to minimize latency while preventing packet loss.

Determining Nominal Jitter Buffer Size

When there is not a significantly large queuing delay or the queuing delay is below a given threshold, the latency compensating adaptive jitter buffer method uses a nominal buffer size determination method to determine the ideal or nominal buffer size based on the history of recently observed queuing delays.

In some embodiments of the present invention, the jitter buffer of the receive process of either the audio client node or the audio conferencing server operates based on a fixed clock interval. The fixed clock intervals represent the times an audio packet is expected to arrive at the destination audio client. The receive process may compute an expected arrival time for audio packets in a call session. In other embodiments, the jitter buffer may operate based on variable clock intervals. In embodiments of the present invention, it is not necessary that the audio packets be arriving at the destination node at fixed time intervals. The audio packets may arrive at the destination node at variable time intervals and the receive process determines the expected arrival time or time range for the audio packets.

In some embodiments, at each clock interval, the nominal buffer size determination method performs the following operations.

First, the method inserts any incoming packets into the jitter buffer. There may be zero or more packets available.

Next, the method records the arrival time of the very first incoming packet, which is referred to as time T0. The subsequent audio packets will have an ideal arrival time relative to time T0 at each fixed clock intervals.

Next, on subsequent packet arrivals, the method compares the actual arrival time to the "ideal" arrival time relative to time T0. The difference in the actual arrival time to the ideal arrival time is a measurement of the packet queuing delay. Some packets may appear to arrive early relative to the ideal time since the establishment of the ideal time base is also subject to any jitter present at time T0. Others packets may arrive later relative to the ideal time.

The nominal buffer size determination method then stores a history of recent packet queuing delay values. The method finds the minimum and maximum packet queuing delay values in the history. The minimum packet queuing delay value is referred to as MinD and the maximum packet queuing delay value is referred to as MaxD.

In embodiments of the present invention, the difference (MaxD−MinD) is the ideal jitter buffer size that would absorb this amount of queuing delay variation with no interruption in the output stream. The ideal jitter buffer size is referred to as the target jitter buffer size, SizeT.

The nominal buffer size determination method keeps a history of the current size of the jitter buffer and uses the size history to compute the "average" size of the jitter buffer over recent history. Various statistical methods can be used to compute the average jitter buffer size. For example, a histogram may be used with the peak or the mode of the histogram taken as the average jitter buffer size. In other examples, the mean of the jitter buffer size history taken over a given time window is used to compute the average jitter buffer size. The average jitter buffer size is referred to as SizeA.

The nominal buffer size determination method then compares the recent average jitter buffer size SizeA to the target size SizeT. If SizeA is not equal to SizeT, the method drops packets or temporarily queues up packets in the jitter buffer to reach the target buffer size SizeT. Specifically, the nominal buffer size determination method compute a value Fill where Fill=SizeT−SizeA. If Fill>0, then the method will need to add more packets than packets being removed in order to increase buffering. If Fill<0 then the method will need to remove more packets than packets are being added in order to decrease the size of the buffer.

Using the adaptive nominal buffer size determination method described above, the nominal or ideal size for the jitter buffer is established as the target size SizeT and the adaptive jitter buffer method adjusts the current size of the buffer so that the average buffer size SizeA is close to or equal to the target buffer size SizeT.

Adaptive Jitter Buffer Method for Handling Queuing Delays

Some networks, such as Wide Area Wireless Networks (WWANs), or Wireless Local Area Networks (WLANs), may experience particularly large network delay variations and queuing delay variations. Wireless network implementations may attempt to provide reliability comparable to wired networks so that they can support protocols, such as TCP/IP, which were originally designed for wired transmission. As a result, wireless implementations may perform packet queuing and retransmission in order to achieve a very low loss rate (for example, less than 0.1%). If the network is performing well, the queuing delay variation may stay under some threshold (for example, 100 milliseconds). But periodically there may be large change in the queuing delay, wherein a packet arrives very late (for example, 1200 milliseconds late) at the destination node. When the queuing delay at a destination node becomes large all of a sudden, for some span of time, the jitter buffer will not be filled with any new data. Eventually the late packet will arrive at the destination node. Many other late packets may be queued up directly behind and arriving at the destination node in a burst after the initial late packet. In the present description, the arrival of an audio packet after the jitter buffer has become empty is referred to as a "queuing delay event." In embodiments of the present invention, the latency compensating adaptive jitter buffer method operates to adjust the jitter buffer size to accommodate the incoming data packets in response to the detection of a queuing delay event.

Figure 3:
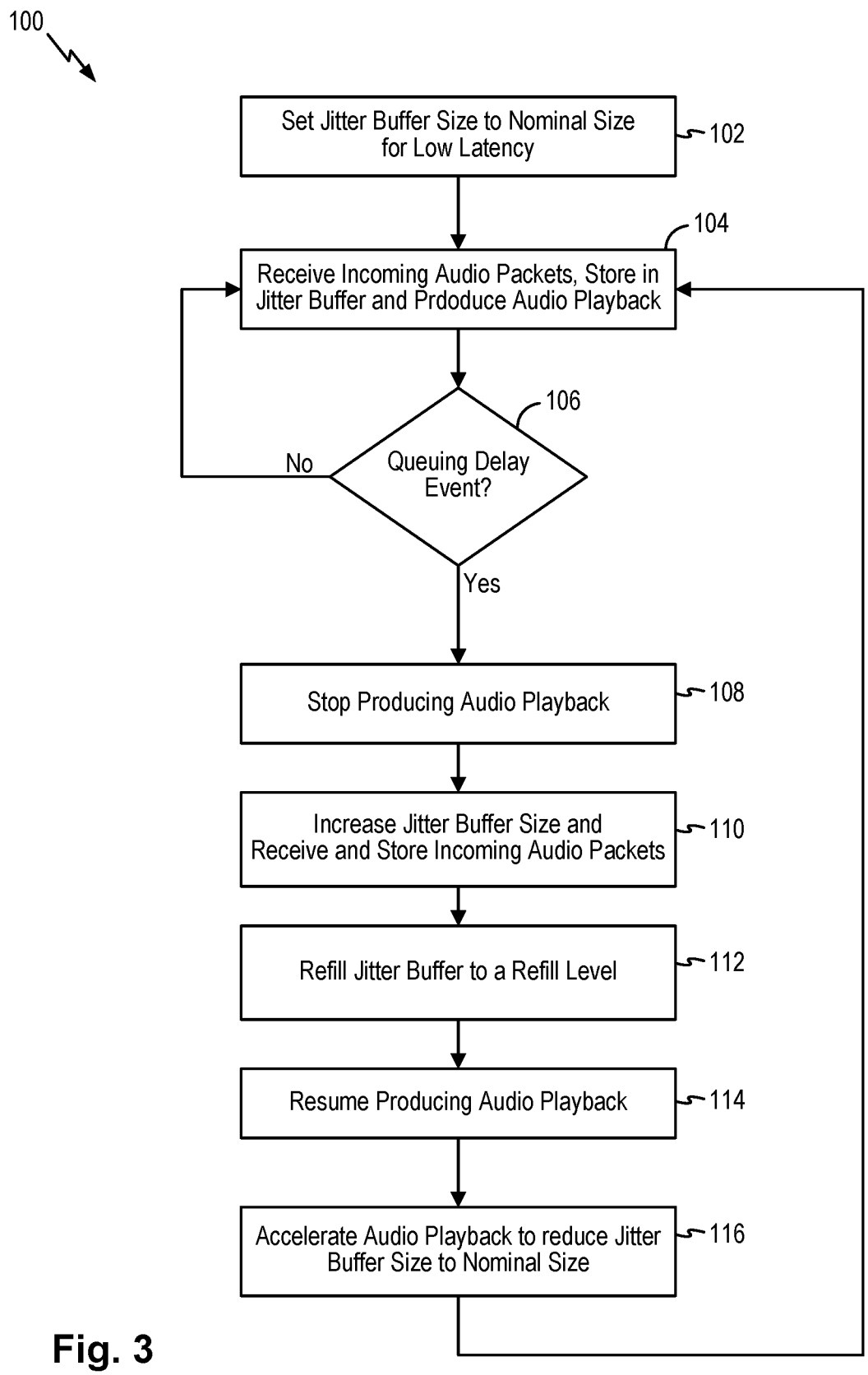
FIG. 3 is a flow chart illustrating the latency compensating adaptive jitter buffer method in some embodiments of the present invention.

FIG. 3 is a flow chart illustrating the latency compensating adaptive jitter buffer method in some embodiments of the present invention. In some embodiment, the latency compensating adaptive jitter buffer method is implemented in the audio client of a user device and, in some embodiments, the method is implemented in the receive process of the audio client. Alternately, the latency compensating adaptive jitter buffer method may be implemented in the receive process of an audio conferencing server facilitating a conference call between multiple participants. The receive process of the audio client or the audio conferencing server includes a jitter buffer for handing network delay or queuing delay variations.

Referring to FIG. 3, a latency compensating adaptive jitter buffer method 100 starts by setting the jitter buffer to the nominal size selected for low latency (102). In some embodiments, the nominal size for the jitter buffer can be established using the nominal buffer size determination method described above. The method 100 receives incoming audio packets, storing the incoming audio packets into the jitter buffer and produce audio playback using the audio packets from the jitter buffer (104).

The latency compensating adaptive jitter buffer method 100 monitors for a queuing delay event (106). In operation, when there is an increase in queuing delay that exceeds the current buffer size of the jitter buffer, the jitter buffer will empty out. In some embodiments, the latency compensating adaptive jitter buffer method 100 may monitor the time duration the jitter buffer is empty. The amount of time duration the jitter buffer is empty measures the amount of accumulated latency. Since the queuing delay is typically temporary, all packets that were delayed (and not lost) will eventually arrive within some short time span. For example, the late packets might all arrive within one jitter buffer clock interval, or they might arrive in several clumps, each separated by relatively small delays.

In embodiments of the present invention, in response to a queuing event being detected (106), the method 100 stops the audio playback (108) and the size of the jitter buffer is allowed to increase to accept the late audio packets rather than discarding them (110). The late arriving audio packets are then stored in the jitter buffer. The jitter buffer is refilled to a given refill level (112) and then audio playback is resumed (114). In embodiments of the present invention, the refill level is greater than the nominal jitter buffer size. The method 100 will start allowing the receive process to supply the audio packets in a first-in-first-out manner from the jitter buffer to the playback mechanism to produce audio signals to the speaker.

With the jitter buffer size thus increased, the latency compensating adaptive jitter buffer method 100 then operates to empty the jitter buffer using accelerated audio playback (116). By accelerating the audio playback, the playback duration of the audio is shortened relative to the original duration. Over time, the accelerated audio playback will remove the accumulated latency from the jitter buffer and the jitter buffer reduces in size to reduce the undesired latency. Method 100 returns to 104 to continue receiving incoming audio packets and producing audio playback at the normal playback rate when the jitter buffer size has returned to the nominal size. In the present description, the amount of accumulated latency that needs to be removed is referred to as "LatencyCompensationDuration". The relationship between the acceleration rate, the original audio duration, the latency removed, and the final playback duration are given by the following equations:

$$\text{OriginalDuration} - \text{OriginalDuration}/\text{AccelerationRate} = \text{LatencyCompensationDuration};$$

$$\text{PlaybackDuration} = \text{OriginalDuration}/\text{AccelerationRate}.$$

In embodiments of the present invention, the latency compensating adaptive jitter buffer method 100 may employ various methods to speed up the audio playback. Methods for accelerated audio playback include sample rate conversion, asynchronous granular overlap add, pitch synchronous overlap add (PSOLA), phase vocoder, and sinusoidal modeling. Other methods for accelerating audio playback can also be used. Sample rate conversion also increases the pitch of the audio and may not be ideal in some applications. Complexity and quality tradeoffs will determine the most appropriate audio acceleration algorithm for specific applications.

In some embodiments, in the case of speech, additional latency can be removed by selectively discarding accumulated packets in the buffer based on a voice or audio activity criteria. For example, if the audio packet is silent or the audio packet has audio activity under a particular amplitude threshold, those packets can be discarded. To reduce the effect of any discontinuity in the output audio stream, the method can crossfade overlap non-discarded packets that bound a sequence of one or more discarded packets. Other more complex phase matching schemes could also be used to reduce discontinuity in the output.

Latency Compensating Adaptive Jitter Buffer Method

Figure 4:
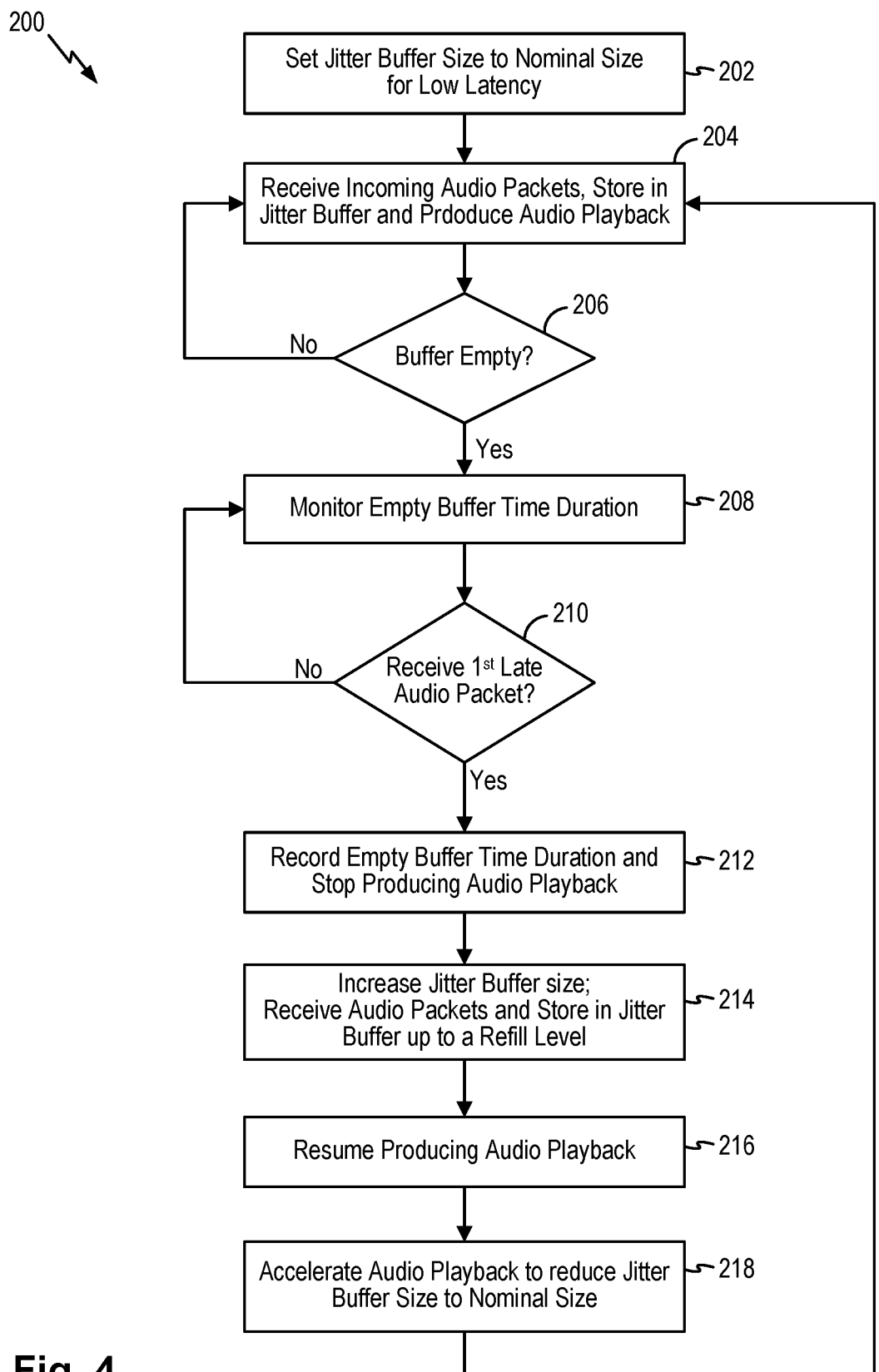
FIG. 4 is a flow chart illustrating the latency compensating adaptive jitter buffer method in alternate embodiments of the present invention.

In embodiments of the present invention, the latency compensating adaptive jitter buffer method compensates for a queuing delay in the event of a detected queuing delay event by refilling the jitter buffer before resuming playback and using accelerated playback to reduce latency. FIG. 4 is a flow chart illustrating the latency compensating adaptive jitter buffer method in alternate embodiments of the present invention. In some embodiment, the latency compensating adaptive jitter buffer method is implemented in the audio client and, in some embodiments, the method is implemented in the receive process of the audio client. Alternately, the latency compensating adaptive jitter buffer method may be implemented in the receive process of an audio conferencing server facilitating a conference call between multiple participants. The receive process of the audio client or the audio conferencing server includes a jitter buffer for handing network delay or queuing delay variations.

Referring to FIG. 4, method 200 starts by setting the jitter buffer to the nominal size for low latency (202). The nominal size can be determined using statistical analysis of historical queuing delay and jitter buffer size data. In some embodiments, the nominal size for the jitter buffer can be established using the nominal buffer size determination method described above. The jitter buffer continues to receive incoming audio packets, to store the incoming audio packets into the jitter buffer and to perform normal audio playback using the audio packets from the jitter buffer (204). Meanwhile, the method 200 determines if the jitter buffer has become empty (206). If the jitter buffer is not empty, then the audio packets are arriving at a normal way and method 200 returns to 204 to receive incoming audio packets and perform normal audio playback.

In the event that the jitter buffer is determined to be empty (206), the method 200 monitors the time duration when the jitter buffer has become empty (208).

The method 200 then monitors when a late audio packet is received after the jitter buffer has become empty (210). If a packet arrives while the buffer is empty, the audio packet is late relative to its ideal or expected arrival time. The method 200 records the time duration from the time when the jitter buffer has become empty to the arrival of the first late audio packet at the destination node as the LatenessDuration (212). The method 200 also stops producing audio playback of the arriving audio packets (212).

As late audio packets start to arrive at the destination node, the late audio packets are stored in the jitter buffer while audio playback has ceased (214). The jitter buffer size is allowed to increase beyond the nominal buffer size so as not to discard any audio packets. The jitter buffer continues queuing up incoming audio packets until the jitter buffer size reaches a refill level greater than the nominal buffer size (214).

In some embodiments, the jitter buffer size is increased to the refill level corresponding to a buffer duration equal to the LatenessDuration multiplied by a refill factor (typically between 1.0-3.0). The refill level is also referred to as the RefillDuration. Accordingly, at 214, the jitter buffer is being refilled by the incoming audio packet while the receive process is prevented from retrieving the audio packets for playback. During the buffer refill time, the jitter buffer will appear empty to the receive process and any attempts to retrieve audio packets from the jitter buffer will produce silence. Allowing the jitter buffer to refill to a certain level before resuming playback ensures that there is a sufficient amount of audio data in the jitter buffer for a smooth playback experience. If the jitter buffer is not refilled sufficiently before audio playback resumes, the audio playback may become choppy as the jitter buffer may run out of audio packets shortly again.

In embodiments of the present invention, refill factors greater than 1.0 can be used to accommodate the scenario where an additional queuing delay event follows close after the initial event. In that case, it is more desirable to use a larger refill factor to increase the jitter buffer size more to ensure even more audio packets being received before resuming playback.

Once the jitter buffer has been refilled to the refill level or the RefillDuration, the method 200 will resume producing audio playback (216). The method 200 will start allowing the receive process to supply the audio packets in a first-in-first-out manner from the jitter buffer to the playback mechanism to produce audio signals to the speaker.

At this point, the jitter buffer will have attained a size much larger than the nominal size or target size. In fact, the jitter buffer will have an accumulated latency equal to the RefillDuration. The method 200 then performs accelerated audio playback to compensate for the added latency (218). In particular, accelerated audio playback is performed to reduce the jitter buffer size, and therefore reducing the resulting latency. When the jitter buffer size is returned to the nominal size, the method 200 returns to 204 to continue to receive incoming audio packets and to perform normal audio playback.

In embodiments of the present invention, the method 200 compares the desired ideal buffer latency to the current buffer latency. The difference is the amount of latency that must be compensated for and is referred herein as "Latency Compensation Duration." In the present description, the size of the jitter buffer (the buffer size) is indicative of the buffer latency and is also sometimes referred to as the duration of the buffer (or buffer duration). In some embodiments, the method 200 removes the Latency Compensation Duration from the jitter buffer by retrieving packets faster than the nominal retrieval rate. In some embodiments, the method uses accelerated audio playback to present a continuous output audio stream to the receive process.

In embodiments of the present invention, the latency compensating adaptive jitter buffer method 200 may employ various methods to speed up the audio playback. Methods for accelerated audio playback include sample rate conversion, asynchronous granular overlap add, pitch synchronous overlap add (PSOLA), phase vocoder, and sinusoidal modeling. Other methods for accelerating audio playback can also be used. Sample rate conversion also increases the pitch of the audio and may not be ideal in some applications. Complexity and quality tradeoffs will determine the most appropriate audio acceleration algorithm for specific applications.

In other embodiments, the method 200 may optionally remove silence from the output audio stream to further reduce latency. In some embodiments, in the case of speech, additional latency can be removed by selectively discarding accumulated packets in the buffer based on a voice or audio activity criteria. For example, if the audio packet is silent or the audio packet has audio activity under a particular amplitude threshold, those packets can be discarded. To reduce the effect of any discontinuity in the output audio stream, the method can crossfade overlap non-discarded packets that bound a sequence of one or more discarded packets. Other more complex phase matching schemes could also be used to reduce discontinuity in the output.

Once the jitter buffer has reached the nominal buffer size, the method 200 returns to 204 to continue to receive incoming audio packets and to perform normal audio playback. The accelerated audio playback is discontinued. In some embodiments, when silence removal is employed, silence removal is also discontinued.

Audible Results During Queuing Delay Events and Subsequent Compensation

The latency compensating adaptive jitter buffer method described above realizes an optimized approach to buffer sizing. Rather than keeping the jitter buffer size large to absorb potential future queuing delays, the jitter buffer size is kept small for the lowest possible latency. When queuing delay event occurs, there will be a temporary interruption (silence) in the output audio stream. The silence will continue until the jitter buffer has refilled to the appropriate level (determined by the refill factor and the computed RefillDuration). Following this interruption, the audio will be played back at an accelerated rate until the latency has returned to an acceptable level. In the case of speech, intelligibility is maintained even when the audio is accelerated. Provided the acceleration is not too extreme, it may even go unnoticed. In a multi-party interactive conversation, the queuing delay event may happen during a period of silence. In this scenario, the additional accumulated latency can be removed immediately and can be completely hidden. For interactive speech applications, the latency compensating adaptive jitter buffer method delivers the benefits of low average latency and high comprehensibility.

Figure 5:
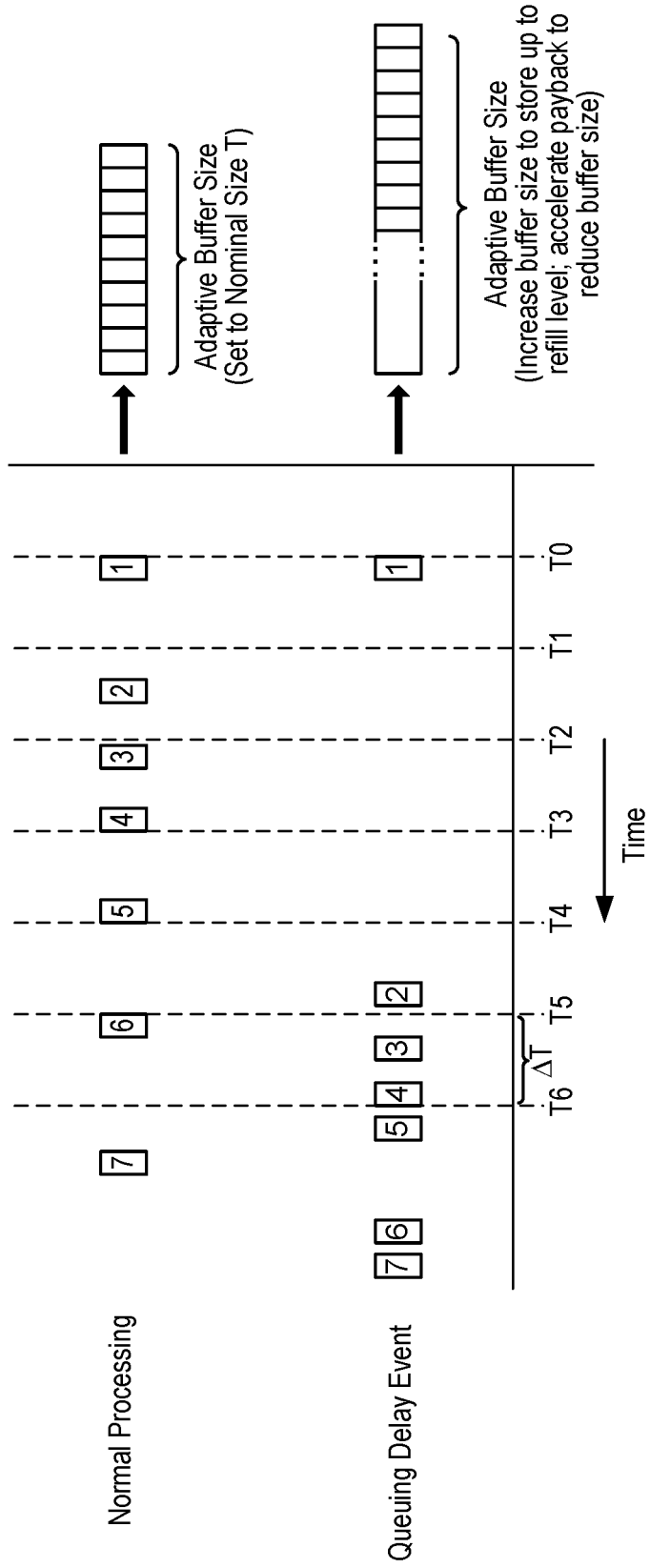
FIG. 5 illustrates the queuing delay event in the audio packet transmission and the adaptive jitter buffer method in embodiments of the present invention.

FIG. 5 illustrates the queuing delay event in the audio packet transmission and the adaptive jitter buffer method in embodiments of the present invention. Referring to FIG. 5, during normal processing, audio packets 1-7 arrive at the destination nodes around their expected arrival times T0 to T6. In the present example, the expected arrival time is assumed to be of a fixed time interval ΔT. In other examples, the expected arrival time can have a variable time interval. During normal processing, the audio packets may arrive earlier or later than the expected time but the packets are arriving in a steady enough rate to ensure the jitter buffer will not become empty as the receive process produces audio from the jitter buffer.

However, in the event of a large queuing delay, a packet 1 may be received at time T0 and then another packet (packet 2) does not arrive for a long time duration so that the jitter buffer becomes emptied. When packet 2 finally arrives at time T5, the jitter buffer implements the latency compensating adaptive jitter buffer method described above and increases the jitter buffer size to allow all the late audio packets (packets 2-7) to be received into the jitter buffer. Meanwhile, audio playback production is stopped until the jitter buffer is refilled to a predetermined refill level. When the jitter buffer has been sufficiently refilled, audio playback production resumes with accelerated playback to reduce the buffer size back down to the nominal level.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for a receive process of an audio client being executed on a device for receiving audio data packets, the method comprising:
    monitoring incoming audio data packets for a queuing delay event;
    in response to a queuing delay event being detected, increasing a size of a jitter buffer from a nominal size to greater than the nominal size;
    storing audio data packets in the jitter buffer up to a refill level that is greater than the nominal size;
    detecting that the jitter buffer has stored audio data packets reaching the refill level; and
    producing audio playback using the audio data packets from the jitter buffer at an accelerated playback rate until the size of the jitter buffer returns to the nominal size.

2. The method of claim 1, further comprising:
    setting the jitter buffer to the nominal size as determined by a history of the jitter buffer size and a target jitter buffer size for absorbing packet queuing delay variations.

3. The method of claim 1, wherein monitoring the incoming audio data packets for a queuing delay event comprises:
    monitoring the arrival of incoming audio data packets after the jitter buffer has become empty as indication of a queuing delay event.

4. The method of claim 1, wherein producing audio playback at the accelerated playback rate comprises:
    using an audio playback acceleration technique selected from at least one of sample rate conversion, asynchronous granular overlap add, pitch synchronous overlap add (PSOLA), phase vocoder, or sinusoidal modeling.

5. The method of claim 1, wherein producing audio playback at the accelerated playback rate comprises:
    discarding accumulated audio data packets having a voice activity under a given amplitude threshold.

6. The method of claim 1, wherein producing audio playback at the accelerated playback rate comprises:
    discarding accumulated audio data packets that are silent.

7. The method of claim 1, wherein monitoring the incoming audio data packets for a queuing delay event comprises:
    determining the jitter buffer has become empty;
    monitoring arrival of incoming audio data packets after the jitter buffer has become empty as indication of a queuing delay event; and
    measuring a first time duration of the jitter buffer becoming empty until an audio data packet has arrived.

8. The method of claim 7, wherein storing audio data packets in the jitter buffer up to a refill level that is greater than the nominal size, comprises:
    storing audio data packets in the jitter buffer up to a refill level corresponding to a buffer duration equal to the first time duration multiplied by a refill factor, the refill factor being 1 or greater.

9. An audio conferencing system for processing audio signals, comprising:
    at least one processor;
    a memory coupled to the processor and configured to provide the processor with instructions to execute a receive process for receiving audio data packets, the receive process being configured to:
        monitor incoming audio data packets for a queuing delay event;

in response to a queuing delay event being detected, increase a size of a jitter buffer to greater than a nominal size;
store audio data packets in the jitter buffer up to a refill level greater than the nominal size;
detect the jitter buffer has stored audio data packets reaching the refill level;
produce audio playback using the audio data packets from the jitter buffer at an accelerated playback rate;
detect the jitter buffer size has returned to the nominal size; and
produce audio playback of the audio data packets from the jitter buffer at a nominal playback rate slower than the accelerated playback rate.

10. The system of claim 9, wherein the processor is configured to set the jitter buffer to the nominal size as determined by a history of the jitter buffer size and a target jitter buffer size for absorbing packet queuing delay variations.

11. The system of claim 9, wherein the processor is configured to monitor arrival of incoming audio data packets after the jitter buffer has become empty as indication of a queuing delay event.

12. The system of claim 9, wherein the processor is configured to produce audio playback at the accelerated playback rate by discarding accumulated audio data packets having a voice activity under a given amplitude threshold.

13. The system of claim 9, wherein the processor is configured to:
determine the jitter buffer has become empty;
monitor the arrival of incoming audio data packets after the jitter buffer has become empty as indication of a queuing delay event; and
measure a first time duration of the jitter buffer becoming empty until an audio data packet has arrived.

14. The system of claim 13, wherein the processor is configured to store audio data packets in the jitter buffer up to a refill level corresponding to a buffer duration equal to the first time duration multiplied by a refill factor, the refill factor being 1 or greater.

15. A device for processing audio signals, comprising:
at least one processor;
a memory coupled to the processor and configured to provide the processor with instructions to execute a receive process for receiving audio data packets, the receive process being configured to:
monitor incoming audio data packets for a queuing delay event;
in response to a queuing delay event being detected, increase a size of a jitter buffer to greater than a nominal size;
produce audio playback using the audio data packets from the jitter buffer at an accelerated playback rate;
detect the size of the jitter buffer returning to the nominal size; and
produce audio playback of the audio data packets from the jitter buffer at a nominal playback rate slower than the accelerated playback rate.

16. The device of claim 15, wherein the processor is configured to set the jitter buffer to the nominal size as determined by a history of the jitter buffer size and a target jitter buffer size for absorbing packet queuing delay variations.

17. The device of claim 15, wherein the processor is configured to monitor arrival of incoming audio data packets after the jitter buffer has become empty as indication of a queuing delay event.

18. The device of claim 15, wherein the processor is configured to produce audio playback at the accelerated playback rate by discarding accumulated audio data packets having a voice activity under a given amplitude threshold.

19. The device of claim 15, wherein the processor is configured to:
determine the jitter buffer has become empty;
monitor the arrival of incoming audio data packets after the jitter buffer has become empty as indication of a queuing delay event; and
measure a first time duration of the jitter buffer becoming empty until an audio data packet has arrived.

20. The device of claim 19, wherein the processor is configured to store audio data packets in the jitter buffer up to a refill level corresponding to a buffer duration equal to the first time duration multiplied by a refill factor, the refill factor being 1 or greater.

* * * * *